United States Patent
Kim et al.

(10) Patent No.: US 8,253,795 B2
(45) Date of Patent: Aug. 28, 2012

(54) EGOMOTION SPEED ESTIMATION ON A MOBILE DEVICE

(75) Inventors: Seung Wook Kim, Santa Clara, CA (US); Stefan Marti, San Francisco, CA (US); Francisco Imai, Mountain View, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 595 days.

(21) Appl. No.: 12/546,084

(22) Filed: Aug. 24, 2009

(65) Prior Publication Data
US 2010/0053324 A1  Mar. 4, 2010

Related U.S. Application Data

(60) Provisional application No. 61/093,651, filed on Sep. 2, 2008.

(51) Int. Cl.
*H04N 7/00* (2011.01)
(52) U.S. Cl. .................................................. 348/142
(58) Field of Classification Search .................. 348/140, 348/142, 135
See application file for complete search history.

(56) References Cited

U.S. PATENT DOCUMENTS

| | | | | |
|---|---|---|---|---|
| 5,764,871 | A * | 6/1998 | Fogel | 345/427 |
| 8,126,269 | B2 * | 2/2012 | Eggert et al. | 382/173 |
| 2006/0020562 | A1 * | 1/2006 | Murali | 706/12 |
| 2008/0137913 | A1 | 6/2008 | Hildreth | |
| 2009/0309765 | A1 | 12/2009 | Wang et al. | |
| 2010/0045667 | A1 | 2/2010 | Kornmann et al. | |

FOREIGN PATENT DOCUMENTS

EP 1089215 A1 4/2001

OTHER PUBLICATIONS

Jingtao Wang et al.; "Camera Phone Based Motion Sensing: Interaction Techniques, Applications and Performance Study"; UIST Oct. 15-18, 2006; Montreux, Switzerland; pp. 1-10.
Merl;"Motion-Based Optical Sensing with Mulitple AR Cameras"; Mitsubishi Electric Research Laboratories; Sep. 12, 2007; p. 1.
Jingtao Wang and John Canny; "TinyMotion: Camera Phone Based Interaction Methods"; CHI Apr. 22-27, 2006; Montreal, Quebec, Canada; pp. 1-6.

* cited by examiner

*Primary Examiner* — Larry Donaghue
(74) *Attorney, Agent, or Firm* — Beyer Law Group LLP (57) ABSTRACT

Linear and rotational speeds of a mobile device are calculated using distance estimates between imaging sensors in the device and objects or scenes in front of the sensors. The distance estimates are used to modify optical flow vectors from the sensors. Shifting and rotational speeds of the mobile device may then be calculated using the modified optical flow vector values. For example, given a configuration where the first imaging sensor and the second imaging sensor face opposite directions on a single axis, a shifting speed is calculated in the following way: multiplying a first optical flow vector and a first distance estimate, thereby deriving a first modified optical flow vector value; multiplying a second optical flow vector and a second distance estimate, thereby deriving a second modified optical flow vector value; the second modified optical flow vector value may then be subtracted from the first modified optical flow vector value, resulting in a measurement of the shifting speed.

24 Claims, 8 Drawing Sheets

EGOMOTION SPEED ESTIMATION ON A MOBILE DEVICE

CROSS-REFERENCE TO RELATED APPLICATIONS

This application claims the benefit of U.S. Provisional Patent Application No. 61/093,651, titled "Gesture and Motion-based Navigation and Interaction with Three-Dimensional Virtual Content on a Mobile Device", filed Sep. 2, 2008, which is hereby incorporated by reference in its entirety.

BACKGROUND OF THE INVENTION

1. Field of the Invention

The present invention relates generally to devices capable of sensing motion and speed. More specifically, it relates to estimating shifting and rotational speeds of devices using imaging and other types of sensors.

2. Description of the Related Art

Presently, motion sensors, such as accelerometers and gyroscopes are not suitable for estimating the speed of complex motions of devices in which they are contained or to which they are attached. This is because they do not efficiently track constant movements. Their mechanisms generally depend on inertial sensors which require integrating acceleration over time to compute speed resulting in potential drifting errors. This is true, for example, with accelerometers and gyroscopes. Another method to measure motion of devices is using an imager which measures the overall "optical flow," which refers to the pattern of apparent motion of objects, surfaces, and edges in a visual scene caused by the relative motion between an observer (an eye or a camera) and the scene. Measuring the overall optical flow in two dimensions (e.g., left-right and up-down) is computationally feasible, but this method fails to distinguish between the linear shifting and rotation movement of the device. Measuring optical flow in more than two dimensions (e.g., 3 to 6), requires substantially more processing power, because the analysis of complex optical flow patterns is required.

Therefore, existing solutions for motion speed estimation of a device limit the design of natural user interfaces for digital content where sensing a user's gesture or body part motion may be important. Furthermore, combining various types of sensors to achieve accurate motion speed estimation requires high computational power and increases the computational complexity of relevant algorithms. It would be useful to have devices that can measure their own egomotion speeds without having to install additional hardware components.

SUMMARY OF THE INVENTION

Methods and systems for accurately measuring the linear and rotational speeds of a mobile device are described. In one embodiment, a method of estimating egomotion speed of a mobile device having at least two imaging sensors is described, wherein the imaging sensors have a specific alignment. Distances between the imaging sensors and objects or scenes in front of each imager are measured. The distance measurements may then be used to modify optical flow vector values created by each of the imaging sensors. Shifting and rotational speeds of the mobile device may then be calculated using the modified optical flow vector values. In another embodiment, a third imaging sensor in the mobile device may be used to measure a distance to a third object or scene. Similarly, the optical flow vectors created from this sensor may be modified using the third distance estimate and may be used to calculate a shifting and rotational speed of the mobile device. In one embodiment, the specific alignment of two of the imaging sensors is the two sensors facing opposite directions on a single axis. In another embodiment, the third imaging sensor may be configured perpendicularly to the first and second imaging sensors. In another embodiment, an autofocus system in the mobile device may be used to measure the distances between the imaging sensors and respective objects or scenes. In another embodiment, active distance sensors may be used to measure the distances.

Figure 2A:
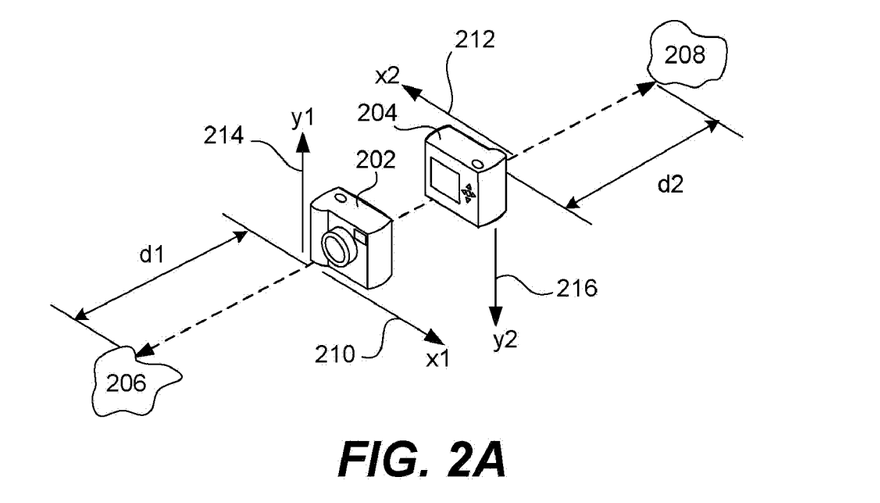
FIG. 2A is a block diagram showing two imaging sensors (shown as cameras for illustrative purposes) facing opposite directions on a single axis.

In another embodiment, wherein two imaging sensors face opposite directions on a single axis, for example, as illustrated in FIG. 2A, a shifting speed is calculated by multiplying a first optical flow vector value and a first distance estimate, thereby deriving a first modified optical flow vector value. Similarly, a second optical flow vector value and a second distance estimate are multiplied, thereby producing a second modified optical flow vector value. The second modified optical flow vector value may then be subtracted from the first modified optical flow vector value. In another embodiment, a rotational speed for the mobile device may be calculated by multiplying a first optical flow vector value and a first distance estimate, deriving a first modified optical flow vector value. Similarly, a second optical flow vector value and a second distance estimate are multiplied producing a second modified optical flow vector value. The second modified optical flow vector value may then be added with the first modified optical flow vector value.

Another embodiment is a mobile device having one or more processors, a memory component, and at least two imaging sensors for measuring optical flow. The mobile device may also have an object distance estimator component or module. In one embodiment, the distance estimator component may be a sub-component of another component within the mobile device. An optical flow vector modification module within the mobile device may be used for adjusting multiple distance factors. A speed calculation module may use the multiple adjusted distance factors to calculate linear and rotational speeds of the mobile device. In one embodiment, an imaging sensor may be a one-dimensional, two-dimensional, or a three-dimensional optical flow sensor. In another embodiment, the mobile device may have an autofocus system which may be used to obtain distance estimates. In another embodiment, the speed calculation module may utilize one or more resolution factors and frame rates of the imaging sensors.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

Methods and components for measuring linear and angular speeds of a mobile device are described in the various figures. Detecting and measuring these types of motion of a mobile device, also referred to as a device's egomotion, utilizes data provided by conventional imaging sensors and other components within or attached to the device. The device is able to use specific distance measurements from such imagers to accurately calculate its own shifting (linear) speed and its rotational (angular) speed without introducing any significant computational complexity or new hardware into the device.

Figure 1A:
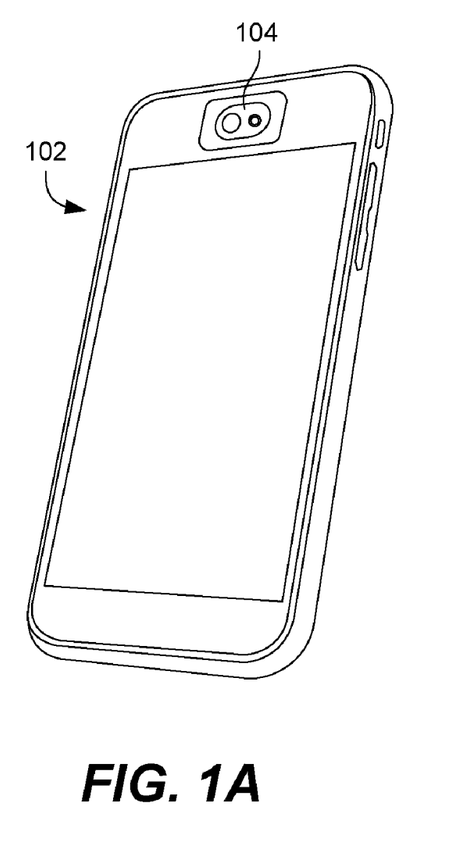
FIG. 1A is a front view of a cell phone showing an imaging sensor at the top center of a cell phone facing the user.
Figure 1B:
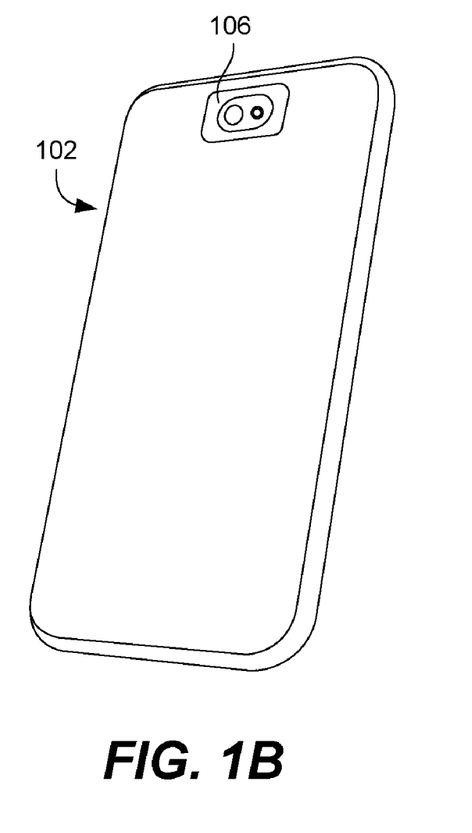
FIG. 1B is a back view of a cell phone and a second imaging sensor facing the area behind the cell phone.
Figure 1C:
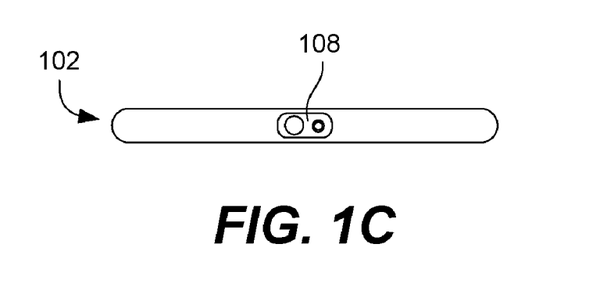
FIG. 1C is a top view of a cell phone and shows an imaging sensor facing the area above the phone.

FIGS. 1A to 1E show examples of two mobile devices and suitable locations of imaging sensors on these devices for implementing various embodiments of the present invention. FIG. 1A is a front view of a cell phone 102 showing an imaging sensor 104, such as a 2D camera, at the top center of cell phone 102 that faces the user. Sensor 104 may also be in the center of the phone or at the bottom. FIG. 1B shows the back of cell phone 102 and a second imaging sensor 106 that faces the area behind cell phone 102. In other embodiments, there may be two or more imagers on the front and back on the cell phone. FIG. 1C is a top view of the cell phone and shows another imaging sensor 108 that faces the area above phone 102. In other embodiments, different types of sensors may be used, such as 3D depth cameras. The specific angular configurations of the sensors are shown in greater detail in FIGS. 2A-2D. In another embodiment, cell phone 102 may have only one imager which may be in the front, back, or on top (as shown in FIGS. 1A to 1C). In another embodiment, cell phone 102 may have two or more imagers, but only one is used for optical flow measurements. In the embodiment in which a single imager is used, cell phone 102 or other device cannot distinguish between rotation and shifting motion, however the device would still be more accurate in measuring overall 2D optical flow because it will take into account a distance estimate. This embodiment is described in FIGS. 6 and 7.

Figure 1D:
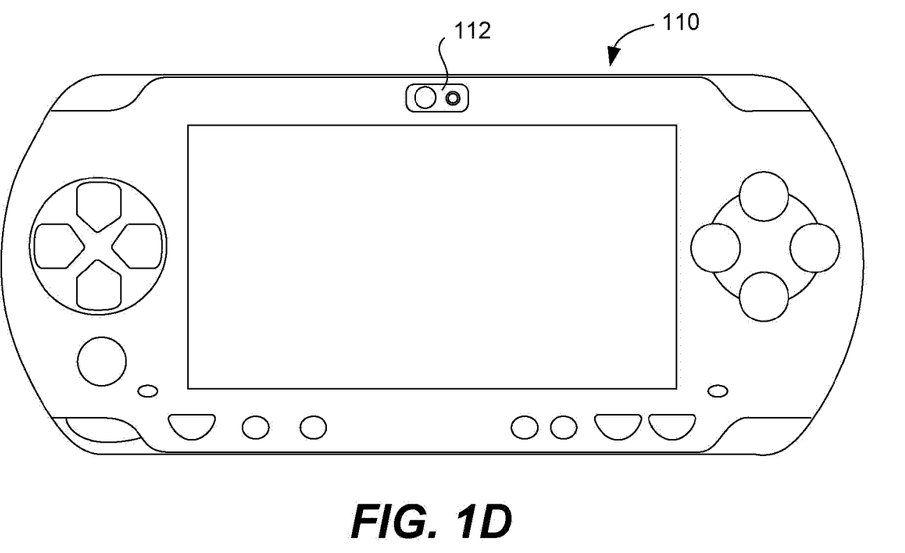
FIG. 1D is a front view of a mobile gaming device showing an imaging sensor facing a user.
Figure 1E:
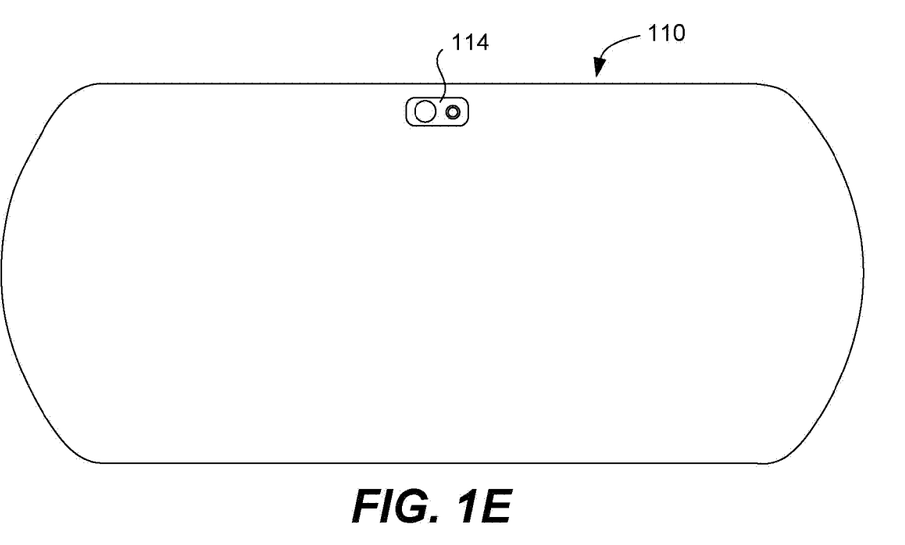
FIG. 1E is a back view of a mobile gaming device showing an imaging sensor facing the area behind the device.

FIG. 1D is a front view of a mobile gaming device 110 showing an imaging sensor 112 facing the user. This sensor is normally used to detect the user's face as the user holds device 110 (typically with both hands). FIG. 1E is a back view of the gaming device and shows another imaging 114 sensor on the back. The imaging sensors in these mobile devices enable them to estimate a distance from the device (specifically, the sensor) to an object (typically the closest one, if one is present) or, more generally, a scene. For example, it may be able to measure the distance to the closest object to the sensor or to the center of an image frame, also referred to as a scene. Conventional imagers, such as 2D and 3D cameras, are able to provide some type of distance estimate as a by-product or incidental output of their design. Some of these may be coarse and others more refined. That is, the imagers typically have other primary or intended functions which they perform for the devices they are contained in, such as taking pictures, videos, or detecting movement. Providing distance estimates to objects or scenes is often not a primary function, but rather an incidental output.

Although only two examples are shown, the mobile device may be any mobile or nomadic device, such as "smart" handset devices, ultra-mobile PCs, mini laptops, netbook computers, or mobile robotic devices. In these and other devices, one or more imaging sensors can be place on the front, back, top, bottom, or sides of the devices. The various embodiments described herein may be implemented in any mobile device, component, system and the like for which accurate linear and angular speed estimates or linear only speed estimates (i.e., egomotion estimates) would be useful, such as for gesture detection. Various types of imaging sensors include: CMOS and CCD imagers, 1D and 2D arrays of photo sensors, IR sensor arrays, and directional radio sensor arrays (in both visible and invisible light ranges). An example of a typical sensor may be an "Artificial Retina" chip, a low level CMOS sensor with built-in 2D optical flow computation.

Figure 6:
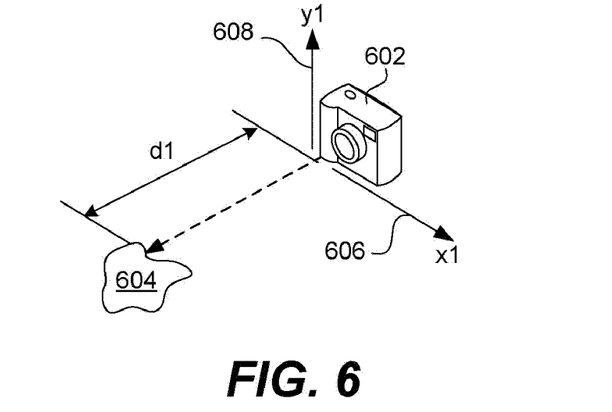
FIG. 6 is a block diagram showing one imager and optic flow vectors in accordance with an alternative embodiment.
Figure 7:
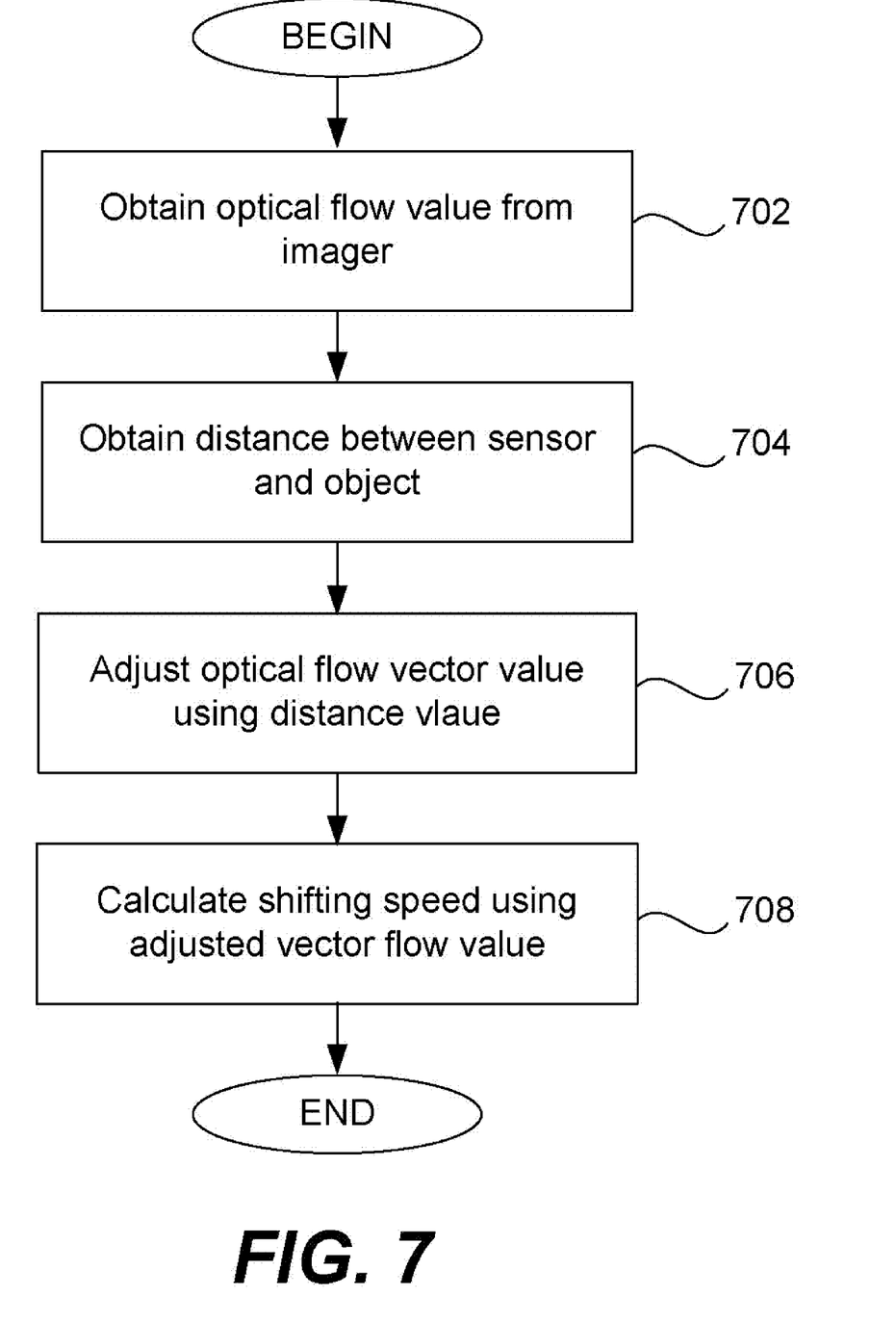
FIG. 7 is a flow diagram of a process of calculating egomotion speed of a mobile device using a single imager in accordance with an alternative embodiment.

FIG. 2A is a block diagram showing two imaging sensors 202 and 204, shown as cameras for illustrative purposes, facing opposite directions on a single axis. It should be understood that the imaging sensors or similar components are contained in or attached to a single device, such as a cell phone, a robotic device, or a mobile gaming device. The angle between the imagers is 180 degrees. An object or scene 206 is in front of imager 202 and object or scene 208 is in front of imager 204. The distances between the imagers and objects are d1 and d2, respectively. The imagers are contained or housed in a mobile device (not shown) and one imager may face the user and the other may face the area behind the device. In another embodiment, imagers may be facing out of the sides or the top and bottom of the mobile device rather than the front and back and still be 180 degrees apart. A single imaging sensor embodiment are shown in FIGS. 6 and 7.

Figure 3:
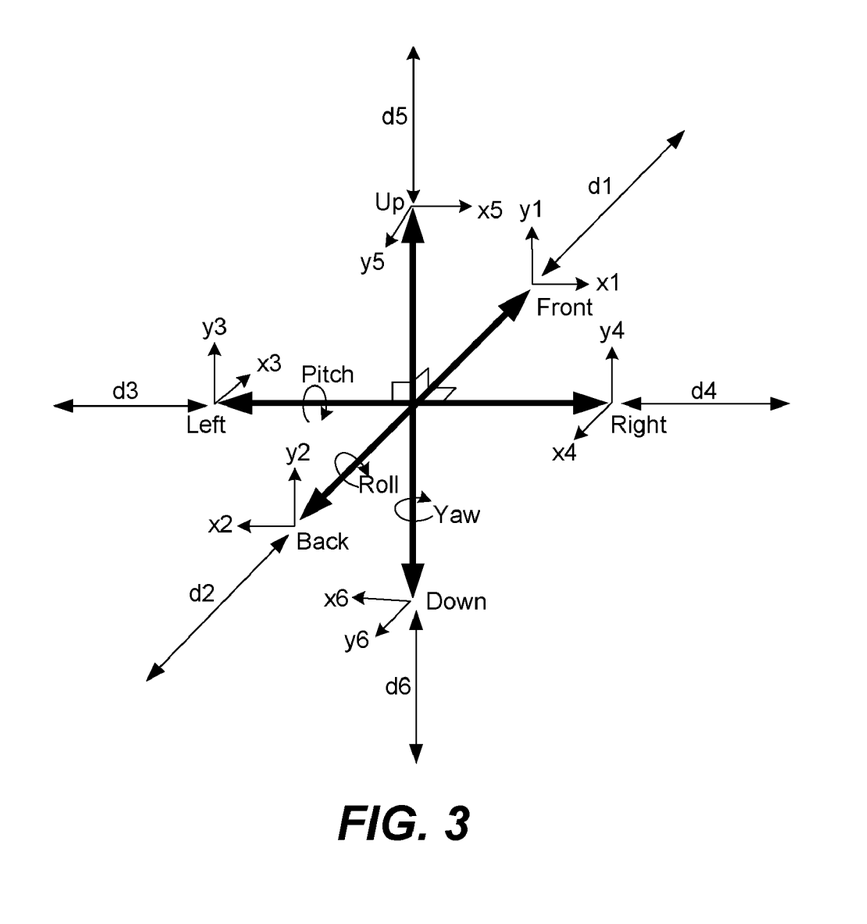
FIG. 3 is a three-dimensional coordinate system showing different possible motions that a mobile device may undergo and the variables associated with these movements.

FIG. 2A also shows horizontal and vertical components of optical flow vectors. Imagers 202 and 204 measure optical flow or movement of objects/scenes 206 and 208. Arrows 210 and 212 represent horizontal components of optical flow vectors for imagers 202 and 204, respectively, and arrows 214 and 216 show vertical components of optical flow vectors for the imagers. In this example, each of the imaging sensors is able to measure 2D optical flow or "2DOF" (horizontal and vertical components). In other embodiments, the imagers may be 3DOF or higher or may be 1DOF. Two 1DOF imagers may be used in one embodiment. A 1DOF imager measures optical flow in one dimension, such as only vertically or horizontally. FIG. 6 shows optical flow vectors for a single imager housed within a device. As shown in FIG. 3, described below, rotation may be yaw, pitch, or roll. Shifting may occur as up-down, front-back, or left-right. As noted, for 2D optical flow, up-down (vertical) and left-right (horizontal) movements are measured.

Figure 2B:
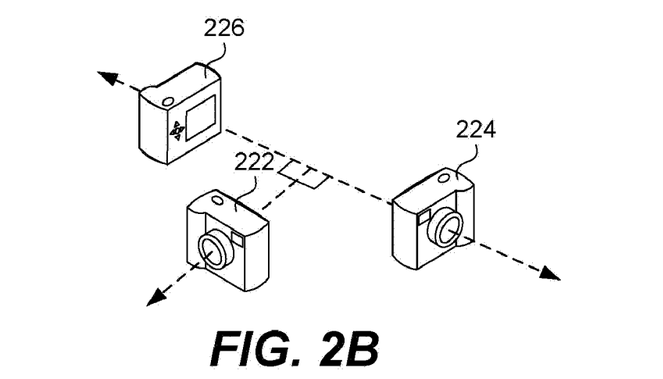
FIG. 2B is another configuration of imagers that may be contained in or attached to a mobile device in accordance with another embodiment.

FIG. 2B is another configuration of imagers that may be contained in or attached to a mobile device in accordance with another embodiment. Here three imagers 222, 224, and 226 (one and a half pair) has one pair facing in opposite directions at 180 degrees (as shown in FIG. 2A) and third imager 222 facing in a perpendicular direction with respect to the pair, that is, at a 90 degree angle from the single axis aligning the other two imagers. For example, if each imager can measure 2D optical flows, this results in 6DOF (3× rotation, 3× shifting, three rotation vector and three shifting vectors).

Figure 2C:
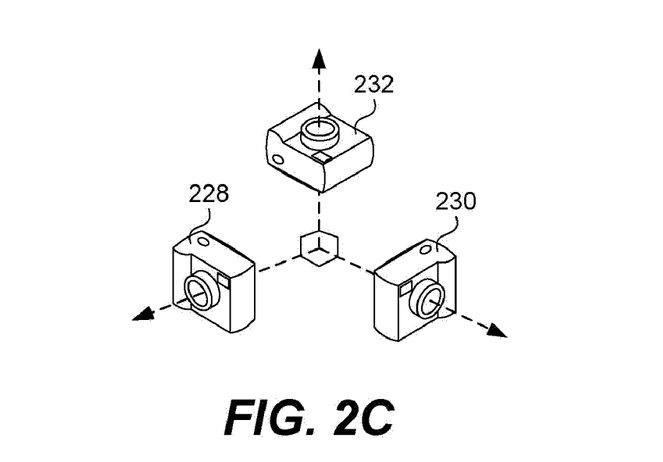
FIG. 2C is another configuration of three imagers arranged perpendicularly to each other in accordance with one embodiment.

In another configuration, shown in FIG. 2C, three imagers 228, 230, and 232 are arranged perpendicularly to each other. For example, in a cell phone, one imager may face the user, another may face out from the top the device, and the third may face the area to one of the sides of the phone, each having a line (or axis) of view that is at 90 degrees to one another. In one embodiment, each imager can measure 2D optical flows, resulting in 6DOF (3× rotation, 3× shifting). In another configuration, shown in FIG. 2D, four imagers 234, 236, 238, and 240 (two pairs) are arranged perpendicularly, each aligned at 90 degree angles to each other. For example, in a cell phone, one imager may be on the back, one in front (facing the user), and one on each side of the cell phone. It may be noted that not all the imagers need to be of the same type or have the same capabilities. Some may be 2D and others may be 1D or 3D or higher. Some may have a lens that is smaller than lenses in the other imagers. As noted above, some imagers may not be cameras but may use other means for tracking optical flow and measuring distance.

FIG. 3 is a three-dimensional coordinate system showing different possible motions that a mobile device may undergo and the variables associated with these movements. It also shows distance values ("distances") that are used in methods for calculating egomotion speeds described below. It shows 2D and 3D optical flows with "distance factors" in six directions and 6DOF motions. The x-axis measures left-right motion, the y-axis measures up-down motion, and the z-axis measures forward and backward motion of a mobile device. A device can rotate on the x-axis (pitch), on the y-axis (yaw), and on the z-axis (roll). Linear movement (also referred to as shifting) of the device to the right is indicated by x1 and x5 and to the left by x2 and x6. Linear movement of the device upwards is shown by y1, y2, y3, and y4. Forward movement is shown as x3 and backward movement is x4, y5, and y6. In one embodiment, there is no downward movement.

Using the imaging sensor configuration shown in FIG. 2A to illustrate one embodiment, the distance between imaging sensor 202 and object 1 is d1 and the distance between the other sensor and object 2 is d2. The optical flow vector has horizontal components x1 and x2 and has vertical components y1 and y2. The shifting or linear speed of a device may be computed using the value derived from taking the difference between the product of d1 and x1 and the product of d2 and x2, that is, x1*d1−x2*d2. The rotational speed may be computed using the value derived from taking the sum of the product of d1 and y1 and d2 and y2: y1*d1+y2*d2. Examples of how these computations can be used to calculate egomotion speed of a device are provided below.

In a device having a pair of 2D imaging sensors, each capturing a scene that is 1 meter away from each imager and has a "resolution" where 1 pixel=0.008 meters in the actual scene, i.e., 0.008 m/(pixel*m) (for ease of explanation, we will refer to this value as "resolution" in this example). The imagers have a frame rate of 10 frames/second (1 frame each 0.1 seconds). The horizontal optical flow magnitudes between two consecutive frames (at a specific time, t) are determined to be +10 pixels (positive to provide direction based on FIG. 3) for one imager (e.g., a left-facing imager or a front-facing imager) and +6 pixels for the other imager (e.g., a right facing imager or a back-facing imager). The scene distance estimate (at specific time, t) from the left imager to the scene/object in front of it is 1 meter and the distance estimate (at time t) from the right imager to the scene/object in front of it is 5 meters. In this scenario, x1=10 pixels, x2=6 pixels, and d1=1 meter and d2=5 meters. To calculate the shifting (linear) speed, measured in m/s, the resolution (0.008 m/(pixel*m)) and the frame rate (1 frame/0.1 second) are used to complete the calculation and arrive at the correct units for motion speed, in this case, m/s. The actual shifting (linear) speed of the device in the example above is −1.5 m/s. That is, the device is moving backward at a speed of 1.5 meters per second. Using the equation described above: x1*d1−x2*d2, we have (10 pixels*1 m−6 pixels*5 m)=−20 pixel*meter. To complete the calculation and arrive at the correct units for linear motion, this result is multiplied by the resolution factor and then divided by the frame rate. Thus, −20 (pixel*m) *0.008 m/(pixel*m)=−0.16 m. This result is divided by the frame rate of 0.1 sec/frame giving: −0.16 m/0.1 sec=−1.6 m/sec. This is 107% of the actual device motion value of −1.5 m/sec.

Taking the same example from above, the actual rotational (angular) speed of the device is 180.00 deg/s counterclockwise. The same values are used for x1, d1, x2, and d2, as well as resolution and frame rate. The difference in the calculations is that the sum of the two products are taken, (rather than the difference for linear speed), and given that the rotational (angular) speed of the pitch (rotation around the x-axis) is being measured, the arc tangent (arctan) of the final result is taken to arrive at the estimated rotational speed measured in deg/s. The first step in the calculation requires summing x1*d1 and x2*d2. Thus, (10 pixels*1 m+6 pixels*5 m)=40 pixel*meters. This is multiplied by the resolution value of 0.008 m/(pixel*m): 40 (pixel*m)*0.008 m/(pixel*m)=0.32 m. This is divided by the frame rate: 0.32 m/0.1 sec. Finally, the arctan of (0.32 m/0.1 sec) is taken, giving 177.45 deg/sec counterclockwise. This estimated angular speed is 99% of the actual device angular speed of 180.00 deg/sec. These two examples show the accuracy of these estimated egomotion speed calculations.

In the examples above, scene or object distance estimates (1 meter and 5 meters) were used to calculate egomotion speeds of the mobile device. In one embodiment, the distance estimates are essentially by-products of the imagers. In other embodiments, actual active distance sensors or proximity detectors may be used for measuring distance. In the scenario above, the imagers are facing in opposite directions as in FIG. 2A. The other configurations shown in FIGS. 2B to 2D require additional distance estimates, such as d3 and d4, which are estimates to scenes from third and fourth imagers, respectively. Similarly, additional horizontal optical flow vector values, such as x3, x4, x5, and x6 and vertical optical flow vector values, such as y2, y3, y4, y5, and y6, all of which are shown in FIG. 3, may be used in the calculations. These distance factors provide distances for imagers having up to 6DOF. Equations for these calculations are described below.

It is worth noting that egomotion speed of a computing device calculated without scene distance estimation, for example, where distance is assumed to be constant (e.g., 1 meter) is not as accurate as the motion speeds calculated using embodiments of the present invention. In fact, they can be significantly inaccurate as not to be useful. For example, using the conventional equation of x1−x2 (with a constant, equal to 1) and with the same resolution and frame rate provides: 10 pixels−6 pixels=4 pixels, multiplied by 0.008 m/pixel equals 0.032 m. This is then divided by the frame rate: 0.032 m/0.1 sec=0.32 m/s. This is not a close estimate of the actual shifting speed of −1.5 m/s (it is −21% of the actual device motion value). In fact, the estimate provides that the device is moving to the right instead of moving to the left. Similar calculations can be made for the angular speed (i.e., taking the sum of x1 and x2 and the arctan at the last step) and a value of 72.94 deg/sec is derived, which is only 41% of the actual device motion value.

The formulas below may be used to compute 2DOF to 6DOF motions for imager configurations shown in FIGS. 2B, 2C, and 2D. For ease of explanation, only calculations involving the distance factors and estimates are provided. In each case, for shifting speed, the value of each formula is multiplied by the resolution factor of the imager (assuming the "resolution" factor is the same for all imagers) and then the resulting value is divided by the frame rate of the imagers (again, assuming the frame rate is the same for all imagers). For angular speeds, the same calculations are applied and the arctan of the final result is taken to obtain a value in deg/sec. A visual representation of variables x1 to x6, y1 to y6, and d1 to d6 are shown in FIG. 3 (it may be helpful to refer to FIG. 3 when examining the formulas below).

FIG. 2B shows three imagers where using the coordinate system of FIG. 3 as a frame of reference, one face left, one face right, and another faces back. It provides the capability to measure the motion of a device in six degrees of freedom (6DOF). For example, the left-right shifting of a mobile gaming device having this imager configuration (i.e., one facing away from the user and two facing out of the sides of the device), can be calculated using the following:

$$x1 \cdot d1 - \frac{x3 \cdot d3 + x4 \cdot d4}{2}$$

Front-back shifting may be calculated using:

x3*d3−x4*d4

Up-down shifting may be calculated using:

y3*d3−y4*d4

Yaw, pitch, and roll may be calculated using the following formulas:

$$\text{Yaw: } x3 \cdot d3 + x4 \cdot d4$$

$$\text{Pitch: } y1 \cdot d1 - \frac{y3 \cdot d3 + y4 \cdot d4}{2}$$

$$\text{Roll: } y3 \cdot d3 + y4 \cdot d4$$

Similarly, for three imagers configured as shown in FIG. 2C (again, referring to FIG. 3), left-right shifting of a mobile device may be calculated using:
Front-back shifting may be calculated using:

$$(-y5*d5 + x3*d3 - y1*d1) * \left(\frac{x3*d3}{-y5*d5}\right)$$

Up-down shifting may be calculated using:

$$(y3*d3 + y1*d1 - x5*d5) * \left(\frac{y1*d1}{y3*d3}\right)$$

Yaw, pitch, and roll may be calculated using the following formulas:

Yaw:(x1*d1+x3*d3)−(x5*d5+y5*d5)

Pitch:(y1*d1+y5*d5)−(y3*d3−x3*d3)

Roll:(y3*d3+x5*d5)−(y1*d1+x1*d1)

These formulas provide several examples of how the shifting and rotational speeds may be calculated. Other formulations using distance estimates to improve accuracy of overall optical flow measurements may be used.

Figure 2D:
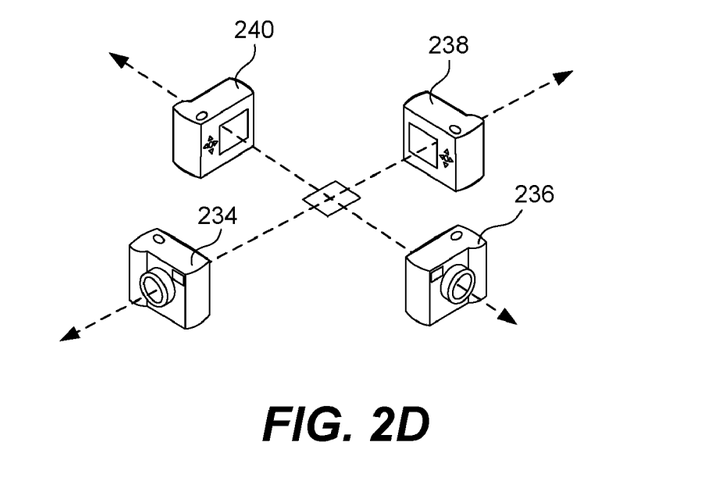
FIG. 2D is another configuration of four imagers (two pairs) arranged perpendicularly, each aligned at 90 degree angles to each other.

In configurations involving four imagers, such as that shown in FIG. 2D, left-right shifting of a mobile device may be calculated using the following formula:

x1*d1−x2*d2

Front-back shifting may be calculated using:

x3*d3−x4*d4

Up-down shifting may be calculated using:
Yaw, pitch, and roll may be calculated using the following formulas:

$$\text{Yaw: } \frac{x1*d1 + x2*d2 + x3*d3 + x4*d4}{2}$$

$$\text{Pitch: } y1*d1 + y2*d2$$

$$\text{Roll: } y3*d3 + y4*d4$$

Figure 4:
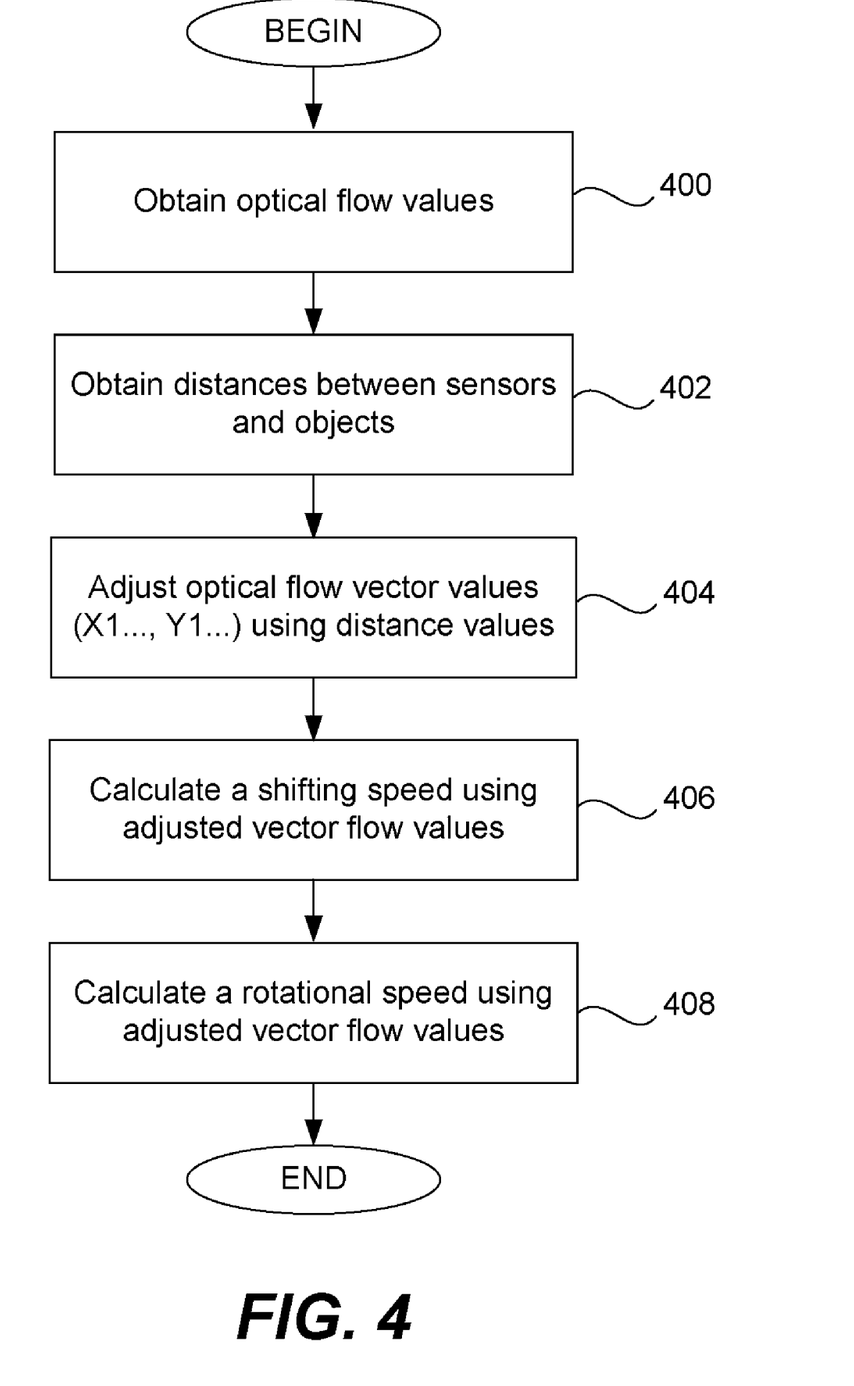
FIG. 4 is a flow diagram of a process of calculating egomotion speed of a mobile computing device in accordance with one embodiment.

FIG. 4 is a flow diagram of a process of calculating egomotion speed of a mobile computing device in accordance with one embodiment. It is assumed that the mobile device, such as a cell phone or a gaming device, has been powered on and that the imaging sensors, such as cameras or other optic flow sensors, are active and that the device is being held by a user using it in a conventional or normal manner. At step 400 the imaging sensors of the mobile device obtain optical flow values. An early description of optical flow calculations are described in Berthold K. P. Horn, Brian G. Schunck, "Determining Optical Flow," Artificial Intelligence, Vol. 17 (1981), pp. 185-203, incorporated by reference herein in its entirety.

At step 402 the imaging sensors obtain estimated distance values between each sensor lens and an object or scene within the field of view of the sensor using the optical flow values. If there is no salient object, the sensors estimate distances to the overall scene, using techniques similar to how autofocus systems determine the best focus setting in conventional cameras. As noted above, this distance measurement may be a by-product of many conventional imaging sensors. The distance estimate need not be precise in order for the method described to calculate egomotion speed of the mobile device. As noted above, the distance estimate may be as coarse as "close," "medium," or "far," or more precise (e.g., resolution of up to 1000 steps, common in many autofocus systems). However, regardless of the resolution of the distance estimates, having some information about distance will increase the precision of the overall system. The distance estimate may be used to modify the 2D optical flow vector values, using a simple calculation, as described above. The distance values, d1, d2, d3 . . . , may be measured in meters or any other suitable measurement unit. The number of distance values will necessarily depend on the number of imagers.

The primary outputs of the imagers are sets of optical flow vector values. For example, referring to FIG. 3, the output of an imager facing the "Front" has vector values, x1 and y1. An imager facing "Back" has vector values x2 and y2. An imager facing "Left" has vector values x3 and y3. Objects or scenes in front of these imagers are d1, d2, and d3 distance values away, respectively. At step 404 these optical flow vector values are modified, or weighted, using the distance values. For example, vector value x1 is modified by being multiplied by d1 (x1*d1). Similarly, vector value y3 is modified by being multiplied by d3. In another example, x5 and y5 are multiplied by d5, and so on. Numerous examples of such weighting of flow vector values are provided above. It may be noted that only a distance value derived by a specific imager is used with optical flow vector values from that specific imager. That is, xn and yn are modified using only dn.

At step 406 a shifting (linear) speed of the mobile device is calculated using the modified horizontal and vertical optical flow vector values. As noted above, a mobile device may shift linearly in at least three different ways: left-right, front-back, and up-down. Referring to FIG. 3, the horizontal vector values corresponds to all the x values (x1 to x6) and vertical vector values correspond to all the y values (y1 to y6). For example, if there is an imager facing "Down," the horizontal optical flow vector value x6 (as modified) may be used to calculate left-right shifting speed, since there are no vertical components. An actual shifting speed having the correct unit value is calculated using a resolution factor, such as the 0.008 m/(pixel*m), and a frame rate, such as 10 frames/second, both from the example above. After the optical flow vector values have been adjusted, the result is multiplied by the resolution factor and the result of this product is divided by the frame rate of the imager. These two calculations take into account properties of the specific imager being used and provide the correct units of the final result (e.g., meters/sec).

At step 408 a rotational or angular speed of the mobile device is calculated using the modified horizontal and vertical optical flow vector values. A mobile device may rotate in at least three different ways: yaw (rotation along the up-down axis), pitch (along the left-right axis), and roll (along the front-back axis). As with the linear speed calculation, the optical flow vector values (xn and yn) are modified or weighted using the distance values determined by each imager. Once the values have been adjusted, the same two calculations (taking the product with the resolution factor and dividing by the frame rate) are performed. For angular speed, the arc tangent of the final result is used to arrive at a final value in the correct units (e.g., deg/second). At this stage the process of estimating the device egomotion speed is complete.

Figure 5:
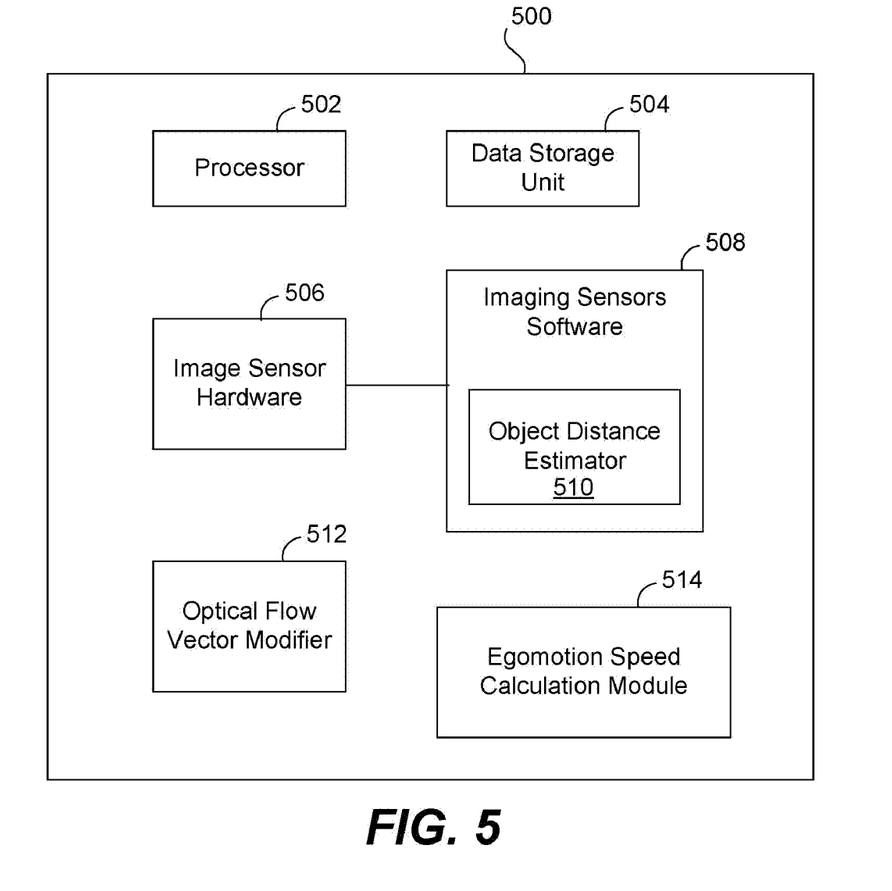
FIG. 5 is a block diagram showing relevant hardware and software components of a mobile computing device capable of measuring its egomotion speed using distance estimates and optic flow values from two or more imaging sensors in accordance with one embodiment of the present invention.

FIG. 5 is a block diagram showing relevant hardware and software components of a mobile computing device capable of measuring its egomotion speed using distance estimates and optic flow values from two or more imaging sensors in accordance with one embodiment of the present invention. The functionality of some of the components and modules described in FIG. 5 has been described above although without reference to the specific modules or components described initially below. Many mobile devices suitable for implementing the present invention, such as mobile device 500, will have at least one processor 502 and a data storage unit 504, which may be implemented as RAM, ROM, a cache, and other types of volatile and non-volatile memory. The wide range of processors 502 and data storage units 504 that may be used will depend on the type of mobile device. For example, a cell phone or smart handset device may have variations of these components that are different from those in an ultra portable laptop PC or a mobile robotic device.

Imaging sensor hardware 506 may be contained within a housing of device 500 or may be external to device 500 (e.g., attached as a peripheral). Various imaging sensor hardware 506 may include 2D and 3D cameras, CMOS and CCD imagers, 1D and 2D arrays of photo sensors, IR sensor arrays, and directional radio sensor arrays (in both visible and invisible light ranges). An example of a typical sensor may be an "Artificial Retina" chip, a low-level CMOS sensor with built-in 2D optical flow computation. As described above, imaging sensor hardware 506 may be configured in one of numerous ways (or more than one if the imagers are external and configurable by the user). For example, the lenses of multiple imagers may point in different directions. Associated with imaging sensor hardware 506 is sensor software 508. This software is responsible for obtaining and processing the optical flow vector values of objects or scenes captured by imagers 506. This may be done in any suitable manner and will likely depend on the type of imaging sensor and the specific software used. One component of the imaging sensor software shown is an object distance estimator 510. Estimator 510 may be implemented in software, firmware, or hardware, as a separate hardware component. As noted above, measuring the distance from an imager to an object or scene is often a by-product of imaging sensor functionality. In one embodiment, estimator module 510 represents the computer instructions that perform this task. In another embodiment, estimator module 510 represents a hardware component. As noted, in other embodiments, active distance sensors or proximity detectors (not part of the imaging sensors) may be used to distance estimates.

An optical flow vector modification module 512 performs the actual modifications to the vector values (xn, yn), as described above. That is, module 512 accords weights to the x and y vector values based on the distance of the object or scene from an imager (shown as image sensor hardware 506). If an object or scene is close to an imager, the optical flow vectors are scaled down (given a lesser weight) by module 512. If an object or scene is further away from an imager, the vectors are scaled up (given a heavier weight) by module 512. An egomotion speed calculation module 514 calculates the shifting (linear) and rotational (angular) speeds of device 500. As is evident from the formulas described, this scaling up or down is done without any significant computational complexity after the actual optical flow algorithm has completed. As described, this scaling requires only straightforward operations and calculations including simple sums, products, and divisions and may be performed by egomotion speed calculation module 514. All the above calculations and software processes are executed by processor 502 and use data storage component 504 as needed.

As noted above, in another embodiment, a device may have only one imager or visual sensor that is used to obtain optical flow vector values. Referring to FIGS. 1A to 1E, the cell phone, mobile gaming device, or other mobile device, may have only one of the imaging sensors shown, as is common in many mobile devices currently in use. To illustrate this embodiment, FIG. 6 shows a block diagram of one imager and associated optic flow vectors. The distance between imaging sensor 602 and object 604 is d1. The optical flow vector has horizontal component x1 (arrow 606) and vertical component y1 (arrow 608). The shifting (linear) speed of a device having one imaging sensor may be computed using the value derived from taking the product of d1 and x1, x1*d1.

Using an example similar to the one used above with respect to FIG. 2A, the actual shifting (linear) speed of the device was determined as 0.5 m/s (using an external calibration method). Furthermore, in this example, the device having one 2D imaging sensor captures a scene that is 0.6 meter away from the imager. The device has a resolution where 1 pixel is approximately 0.008 meters in the actual scene, i.e., 0.008 m/(pixel*m). The imager has a frame rate of 10 frames/second (1 frame each 0.1 seconds). The horizontal optical flow magnitude between two consecutive frames (at a specific time, t) is determined to be +10 pixels (positive to provide direction based on FIG. 3) for the imager. The scene distance estimate (at specific time, t) from the imager to the scene/object in front of it is 0.6 meters. In this scenario, $x1=10$ pixels and $d1=0.6$ meters. To calculate the shifting (linear) speed, measured in m/s, the resolution (0.008m/(pixel*m)) and the frame rate (1 frame/0.1 second) are used to complete the calculation. Using the equation described above: $x1*d1$, we have (10 pixels*0.6 m)=6 pixel*meter. To complete the calculation and arrive at the correct units for linear motion, this result is multiplied by the resolution factor and then divided by the frame rate. Thus, 6 (pixel*m)*0.008 m/(pixel*m)= 0.048 m. This result is divided by the frame rate of 0.1 sec/frame giving: 0.048 m/0.1 sec=0.48 m/sec. This is 96% of the actual device motion value of 0.50 m/sec. For any system which does not consider distance to modify the motion vectors, the estimated shifting speed is 0.8 m/s (assuming a fixed distance of 1 m), which is 160% of the actual shifting speed.

FIG. 7 is a flow diagram of a process of calculating egomotion speed of a mobile computing device having one imaging sensor in accordance with one embodiment. It is assumed that the mobile device, such as a cell phone or a gaming device, has been powered on and that the imaging sensor, such as a camera or other optic flow sensor, is active and that the device is being held by a user using it in a generally conventional manner. At step 702 the imaging sensor of the mobile device obtains optical flow values.

At step 704 the imaging sensor obtains estimated a distance value between the sensor lens and an object or scene within the field of view of the sensor using the optical flow values. As described above, if there is no salient object, the sensors estimate distances to the overall scene. The distance estimate need not be precise in order for the method described to calculate egomotion speed of the mobile device. As noted, the distance estimate may be coarse or precise. However, regardless of the resolution of the distance estimate, having some information about distance will increase the precision of the overall system. The distance estimate may be used to modify the 2D optical flow vector values using a simple calculation. The distance value, d1, may be measured in meters or any other suitable unit.

The primary output of the imager is a set of optical flow vector values. For example, referring to FIG. 3, the output of the imager facing the "Front" has vector values, x1 and y1, as shown in FIG. 6. An object or scene in front of the imager is d1 distance value away. At step 706 the optical flow vector value is modified, or weighted, using the distance value. Thus, vector value x1 is modified by being multiplied by d1 (x1*d1).

At step 708 a shifting (linear) speed of the mobile device is calculated using the modified horizontal and vertical optical flow vector values. Referring to FIG. 3, the horizontal vector value corresponds to all the x values (x1 to x6) and vertical vector values correspond to all the y values (y1 to y6). For example, if the imager is facing "Down," the horizontal optical flow vector value x6 (as modified) may be used to calculate left-right shifting speed, since there are no vertical components. An actual shifting speed having the correct unit value is calculated using a resolution factor, such as the 0.008 m/(pixel*m), and a frame rate, such as 10 frames/second, both from the example above. After the optical flow vector value has been adjusted, the result is multiplied by the resolution factor and the result of this product is divided by the frame rate of the imager. These two calculations take into account properties of the specific imager being used and provide the correct units of the final result (e.g., meters/sec). At this stage the process of detecting the egomotion speed of a device having one imaging sensor is complete.

Figure 8:
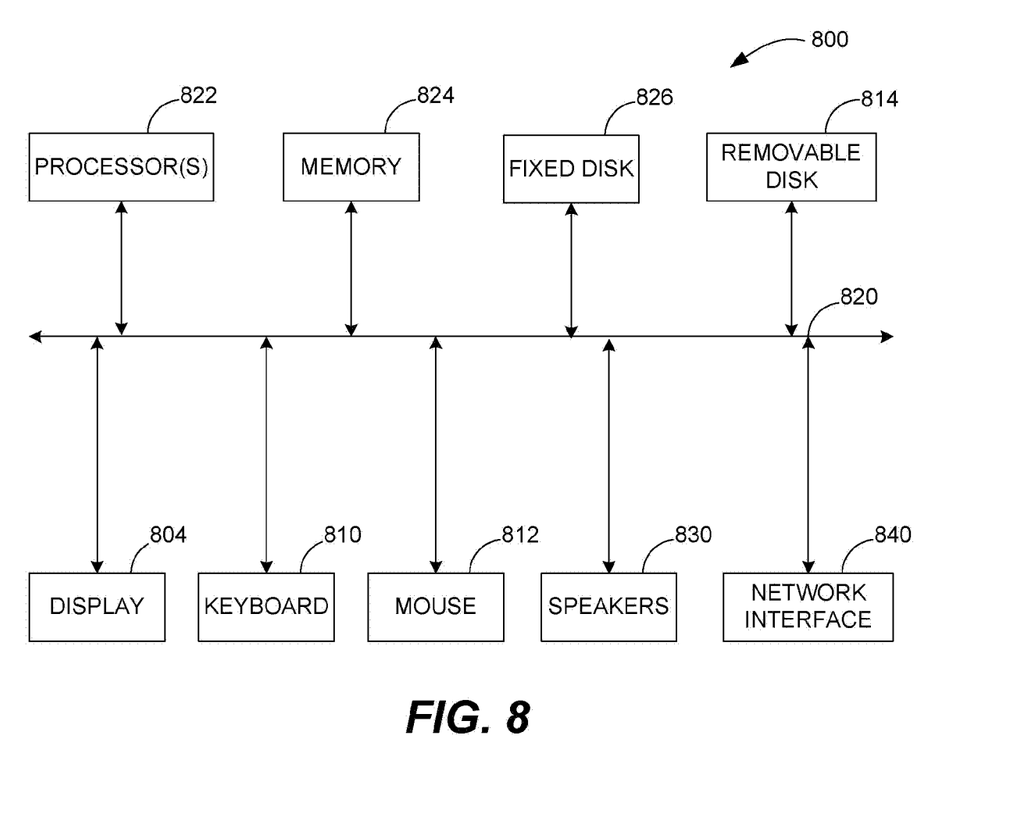
FIG. 8 illustrates system components suitable for implementing embodiments of the present invention.

FIG. 8 illustrates components of a computing system 800 suitable for implementing embodiments of the present invention. Attached to system bus 820 are various subsystems. Processor(s) 822 (also referred to as central processing units, or CPUs) are coupled to storage devices including memory 824. Memory 824 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 826 is also coupled bi-directionally to CPU 822; it provides additional data storage capacity and may also include any of the computer-readable media described below. Fixed disk 826 may be used to store programs, data and the like and is typically a secondary storage medium (such as a hard disk) that is slower than primary storage. It will be appreciated that the information retained within fixed disk 826, may, in appropriate cases, be incorporated in standard fashion as virtual memory in memory 824. Removable disk 814 may take the form of any of the computer-readable media described below.

CPU 822 is also coupled to a variety of input/output devices such as display 804, keyboard 810, mouse 812 and speakers 830. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 822 optionally may be coupled to another computer or telecommunications network using network interface 840. With such a network interface, it is contemplated that the CPU might receive information from the network, or might output information to the network in the course of performing the above-described method steps. Furthermore, method embodiments of the present invention may execute solely upon CPU 822 or may execute over a network such as the Internet in conjunction with a remote CPU that shares a portion of the processing. Finally, device 800 has as one or more of its subsystems imaging sensor hardware as shown in FIG. 5.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of estimating motion speed of a mobile device having a first imaging sensor and a second imaging sensor, the method comprising:
   measuring a first distance between the first imaging sensor and a first object and a second distance between the second imaging sensor and a second object;
   modifying first optical flow vector values created by the first sensor using the first distance and modifying second optical flow vector values created by the second sensor using the second distance;
   calculating a shifting speed and a rotational speed of the mobile device using modified first optical flow vector values and modified second optical flow vector values; and
   wherein the first imaging sensor and the second imaging sensor have a specific alignment.

2. A method as recited in claim 1 further comprising:
   measuring a third distance between a third imaging sensor and a third object; and
   modifying third optical flow vector values created by the third sensor using the third distance.

3. A method as recited in claim 2 wherein calculating a shifting speed or a rotational speed further comprises:
   using modified third optical flow vector values.

4. A method as recited in claim 1 wherein the specific alignment is the first imaging sensor and the second imaging sensor facing opposite directions on a single axis.

5. A method as recited in claim 2 wherein the third imaging sensor is configured perpendicularly to the first imaging sensor and the second imaging sensor.

6. A method as recited in claim 1 wherein calculating the shifting speed and the rotational speed requires an overall optical flow.

7. A method as recited in claim 2 further comprising:
   utilizing an autofocus system in the mobile device for measuring the first distance, the second distance, or the third distance.

8. A method as recited in claim 2 further comprising:
   utilizing active distance sensors for measuring the first distance, the second distance, or the third distance.

9. A method as recited in claim 1 wherein calculating a shifting speed further comprises:
   multiplying a first optical flow vector value and the first distance, producing a first modified optical flow vector value;
   multiplying a second optical flow vector value and the second distance, producing a second modified optical flow vector value; and
   subtracting the second modified optical flow vector value from the first modified optical flow vector value.

10. A method as recited in claim 1 wherein calculating a rotational speed further comprises:
    multiplying the first optical flow vector value and the first distance, producing a first modified optical flow vector value;
    multiplying the second optical flow vector value and the second distance, producing the second modified optical flow vector value; and
    adding the second modified optical flow vector value with the first modified optical flow vector value.

11. A mobile device comprising:
    one or more processors;
    a memory component;
    a first imaging sensor for measuring a first optical flow having a first horizontal component and a first vertical component;
    a second imaging sensor for measuring a second optical flow having a second horizontal component and a second vertical component;
    an object distance estimator component;
    an optical flow vector modification module for adjusting a plurality of distance factors; and
    a speed calculation module using the plurality of adjusted distance factors.

12. A mobile device as recited in claim 11 wherein the first imaging sensor is one of a one-dimensional optical flow sensor, a two-dimensional optical flow sensor, or a three-dimensional optical flow sensor.

13. A mobile device as recited in claim 11 wherein the second imaging sensor is one of a one-dimensional optical flow sensor, a two-dimensional optical flow sensor, or a three-dimensional optical flow sensor.

14. A mobile device as recited in claim 11 further comprising:
    an autofocus system.

15. A mobile device as recited in claim 11 further comprising:
    an active distance sensor.

16. A mobile device as recited in claim 11 wherein the speed calculation module further utilizes one or more resolution factors of the first imaging sensor and the second imaging sensor.

17. A mobile device as recited in claim 11 wherein the speed calculation module further utilizes one or more frame rates of the first imaging sensor and the second imaging sensor.

18. A computer-readable medium containing computer instructions for estimating motion speed of a mobile computing device having a first imaging sensor and a second imaging sensor, the computer-readable medium comprising:
    computer instructions for measuring a first distance between the first imaging sensor and a first object and a second distance between the second imaging sensor and a second object;
    computer instructions for modifying first optical flow vector values created by the first sensor using the first distance and modifying second optical flow vector values created by the second sensor using the second distance; and
    computer instructions for calculating a shifting speed and a rotational speed of the mobile device using modified first optical flow vector values and modified second optical flow vector values;
    wherein the computer-readable medium is a tangible and persistent data storage device.

19. A computer-readable medium as recited in claim 18 further comprising:
    computer instructions for measuring a third distance between a third imaging sensor and a third object; and
    computer instructions for modifying third optical flow vector values created by the third sensor using the third distance.

20. A computer-readable medium as recited in claim 18 wherein computer instructions for calculating a shifting speed or a rotational speed further comprises:
    computer instructions for using modified third optical flow vector values.

21. A computer-readable medium as recited in claim 18 further comprising:
    computer instructions for utilizing an autofocus system in the mobile computing device for measuring the first distance, the second distance, or the third distance.

22. A computer-readable medium as recited in claim 18 further comprising:

computer instructions for utilizing active distance sensors for measuring the first distance, the second distance, or the third distance.

23. A computer-readable medium as recited in claim 18 wherein computer instructions for calculating a shifting speed further comprises:

computer instructions for multiplying a first optical flow vector value and the first distance, producing a first modified optical flow vector value;

computer instructions for multiplying a second optical flow vector value and the second distance, producing a second modified optical flow vector value; and computer instructions for subtracting the second modified optical flow vector value from the first modified optical flow vector value.

24. A computer-readable medium as recited in claim 23 wherein computer instructions for calculating a rotational speed further comprises:

computer instructions for multiplying the first optical flow vector value and the first distance, producing a first modified optical flow vector value;

computer instructions for multiplying the second optical flow vector value and the second distance, producing the second modified optical flow vector value; and computer instructions for adding the second modified optical flow vector value with the first modified optical flow vector value.

* * * * *